United States Patent
Yankovich et al.

(10) Patent No.: US 11,563,818 B2
(45) Date of Patent: Jan. 24, 2023

(54) GENERATING ATTRIBUTE PREFERENCE MODELS BASED ON DISPARATE ATTRIBUTE SPECTRUMS

(71) Applicant: eBay Inc., San Jose, CA (US)

(72) Inventors: Steve Yankovich, San Jose, CA (US); Sergio Pinzon Gonzales, Jr., San Jose, CA (US)

(73) Assignee: eBay Inc., San Jose, CA (US)

( * ) Notice: Subject to any disclaimer, the term of this patent is extended or adjusted under 35 U.S.C. 154(b) by 270 days.

(21) Appl. No.: 17/008,196

(22) Filed: Aug. 31, 2020

(65) Prior Publication Data

US 2020/0404072 A1 Dec. 24, 2020

Related U.S. Application Data

(63) Continuation of application No. 16/040,391, filed on Jul. 19, 2018, now Pat. No. 10,798,211.

(Continued)

(51) Int. Cl.
*A61N 1/00* (2006.01)
*H04L 67/306* (2022.01)
(Continued)

(52) U.S. Cl.
CPC ........ *H04L 67/306* (2013.01); *G06F 16/9535* (2019.01); *G06N 20/00* (2019.01);
(Continued)

(58) Field of Classification Search
CPC ..... H04L 67/306; H04L 67/535; G06N 20/00; G06F 16/9535; G06V 20/20; G06V 20/80;
(Continued)

(56) References Cited

U.S. PATENT DOCUMENTS 6,266,649 B1 7/2001 Linden et al.
7,987,182 B2 7/2011 Slothouber et al.
(Continued)

FOREIGN PATENT DOCUMENTS

CN 105867610 A 8/2016
WO 2007/055618 A2 5/2007
(Continued)

OTHER PUBLICATIONS

Final Office Action Received for U.S. Appl. No. 16/040,351, dated Apr. 19, 2021, 30 Pages.
(Continued)

*Primary Examiner* — Isaac M Woo
(74) *Attorney, Agent, or Firm* — FIG. 1 Patents

(57) ABSTRACT

An attribute correlation system reduces network traffic and processing cycles associated with impromptu item selections by generating attribute preference models based on disparate attribute spectrums. The attribute correlation system deploys the attribute preference models to select individual items from various disparate "candidate item categories." Generally described, the attribute preference models facilitate analyzing item sets across a wide variety of disparate "candidate" item categories to preemptively identify individual items for a user. In this way, the individual items may be identified and, ultimately, selected for the user even absent any indication that the user has searched for otherwise identified these items or even other items from within the disparate "candidate" item categories. The "candidate" item categories may be determined to be disparate from one another based on a relationship void existing such that predefined relationships are missing between these "candidate" item categories.

20 Claims, 8 Drawing Sheets

Related U.S. Application Data

(60) Provisional application No. 62/630,192, filed on Feb. 13, 2018.

(51) Int. Cl.

| | |
|---|---|
| *G06Q 30/06* | (2012.01) |
| *G06N 20/00* | (2019.01) |
| *G06Q 30/02* | (2012.01) |
| *G06Q 50/04* | (2012.01) |
| *G06V 20/20* | (2022.01) |
| *G06V 20/80* | (2022.01) |
| *G06V 40/20* | (2022.01) |
| *H04L 67/50* | (2022.01) |
| *G06F 16/9535* | (2019.01) |
| *G06Q 10/08* | (2012.01) |
| *G06Q 50/00* | (2012.01) |

(52) U.S. Cl.
CPC ....... *G06Q 10/083* (2013.01); *G06Q 30/0202* (2013.01); *G06Q 30/0241* (2013.01); *G06Q 30/0256* (2013.01); *G06Q 30/0603* (2013.01); *G06Q 30/0621* (2013.01); *G06Q 30/0627* (2013.01); *G06Q 30/0631* (2013.01); *G06Q 30/0641* (2013.01); *G06Q 30/0643* (2013.01); *G06Q 50/04* (2013.01); *G06V 20/20* (2022.01); *G06V 20/80* (2022.01); *G06V 40/20* (2022.01); *H04L 67/535* (2022.05); *G06Q 50/01* (2013.01)

(58) Field of Classification Search
CPC .. G06V 40/20; G06Q 10/083; G06Q 30/0202; G06Q 30/0241; G06Q 30/0256; G06Q 30/0603; G06Q 30/0621; G06Q 30/0627; G06Q 30/0631; G06Q 30/0641; G06Q 30/0643; G06Q 50/04; G06Q 50/01
USPC .................................................. 707/600–899
See application file for complete search history.

(56) References Cited

U.S. PATENT DOCUMENTS

| | | |
|---|---|---|
| 8,219,438 B1 | 7/2012 | Moon et al. |
| 8,775,230 B2 | 7/2014 | Casas et al. |
| 8,787,707 B1 | 7/2014 | Steves et al. |
| 8,805,838 B1 | 8/2014 | Khoshnevisan et al. |
| 9,304,332 B2 | 4/2016 | Fonte et al. |
| 9,330,407 B2 | 5/2016 | Beaver et al. |
| 9,454,780 B2 | 9/2016 | Paul et al. |
| 9,652,797 B2 | 5/2017 | Vijayaraghavan et al. |
| 9,760,935 B2 | 9/2017 | Aarabi |
| 10,798,211 B2 | 10/2020 | Yankovich et al. |
| 11,115,492 B2 | 9/2021 | Yankovich et al. |
| 2005/0177453 A1 | 8/2005 | Anton et al. |
| 2008/0004951 A1 | 1/2008 | Huang et al. |
| 2008/0033939 A1 | 2/2008 | Khandelwal |
| 2008/0222119 A1 | 9/2008 | Dai et al. |
| 2009/0259687 A1 | 10/2009 | Do et al. |
| 2010/0185309 A1 | 7/2010 | Ohiaer et al. |
| 2011/0184806 A1 | 7/2011 | Chen et al. |
| 2012/0050529 A1 | 3/2012 | Bentley |
| 2012/0109777 A1 | 5/2012 | Lipsitz et al. |
| 2012/0231840 A1 | 9/2012 | Calman et al. |
| 2013/0190903 A1 | 7/2013 | Balakrishnan et al. |
| 2014/0052563 A1 | 2/2014 | Watkins et al. |
| 2014/0193001 A1 | 7/2014 | Oishi |
| 2014/0279180 A1 | 9/2014 | Beaver et al. |
| 2014/0316995 A1 | 10/2014 | Paul et al. |
| 2015/0066644 A1 | 3/2015 | Narasimhan et al. |
| 2015/0101134 A1 | 4/2015 | Manz et al. |
| 2015/0154322 A1 | 6/2015 | Fonte et al. |
| 2015/0186970 A1 | 7/2015 | Holman et al. |
| 2015/0220566 A1 | 8/2015 | Cumming et al. |
| 2015/0248473 A1 | 9/2015 | Kenedy et al. |
| 2015/0248719 A1 | 9/2015 | Hansen |
| 2015/0339757 A1 | 11/2015 | Aarabi |
| 2016/0051078 A1 | 2/2016 | Jenkins et al. |
| 2016/0335667 A1 | 11/2016 | Aubrey |
| 2017/0278135 A1 | 9/2017 | Majumdar et al. |
| 2017/0337611 A1 | 11/2017 | Hsiao et al. |
| 2018/0285461 A1* | 10/2018 | Smith ................ G06F 16/3325 |
| 2019/0073697 A1 | 3/2019 | Varley |
| 2019/0251613 A1 | 8/2019 | Yankovich et al. |
| 2019/0251616 A1 | 8/2019 | Yankovich et al. |
| 2019/0253514 A1 | 8/2019 | Yankovich et al. |
| 2021/0368021 A1 | 11/2021 | Yankovich et al. |

FOREIGN PATENT DOCUMENTS

| | | |
|---|---|---|
| WO | 2017/011811 A1 | 1/2017 |
| WO | 2019160601 A1 | 8/2019 |
| WO | 2019160602 A1 | 8/2019 |
| WO | 2019160603 A1 | 8/2019 |

OTHER PUBLICATIONS

Notice of Allowance Received for U.S. Appl. No. 16/040,351, dated Jul. 8, 2021, 17 Pages.
Final Office Action Received for U.S. Appl. No. 16/040,369, dated Jun. 1, 2021, 22 Pages.
Graham et al., "Computer vision for sports: Current applications and research topics,", vol. 159, Apr. 26, 2017, pp. 3-18.
Non-final Office Action received for U.S. Appl. No. 16/040,369, dated Dec. 13, 2021, 28 pages.
Non-Final Office Action received for U.S. Appl. No. 16/040,369, dated Jan. 8, 2021, 16 Pages.
Supplemental Notice of Allowability Received for U.S. Appl. No. 16/040,351, dated Jul. 28, 2021, 3 Pages.
Non Final Office Action received for U.S. Appl. No. 16/040,369, dated Aug. 30, 2021, 23 pages.
International Search Report received for PCT Application No. PCT/US2018/065644, dated Feb. 27, 2019, 4 pages.
International Search Report received for PCT Application No. PCT/US2018/065659, dated Mar. 6, 2019, 3 pages.
International Search Report received for PCT Application No. PCT/US2018/065670, dated Mar. 6, 2019, 3 pages.
International Written Opinion received for PCT Application No. PCT/US2018/065644, dated Feb. 27, 2019, 7 pages.
International Written Opinion received for PCT Application No. PCT/US2018/065659, dated Mar. 6, 2019, 6 pages.
International Written Opinion received for PCT Application No. PCT/US2018/065670, dated Mar. 6, 2019, 6 pages.
Non Final Office Action Received for U.S. Appl. No. 16/040,351, dated Oct. 14, 2020, 22 Pages.
Response to Restriction Requirement filed on Apr. 14, 2020 for U.S. Appl. No. 16/040,351, dated Feb. 14, 2020, 10 pages.
Response to Restriction Requirement Filed on Jul. 20, 2020, for U.S. Appl. No. 16/040,351, dated May 19, 2020, 12 pages.
Restriction Requirement Received for U.S. Appl. No. 16/040,351, dated Feb. 14, 2020, 6 pages.
Restriction Requirement Received for U.S. Appl. No. 16/040,351, dated May 19, 2020, 6 pages.
Response to Restriction Requirement filed on Aug. 17, 2020 for U.S. Appl. No. 16/040,369, dated Jun. 15, 2020, 13 pages.
Restriction Requirement Received for U.S. Appl. No. 16/040,369, dated Jun. 15, 2020, 7 pages.
Non-Final Office Action Received for U.S. Appl. No. 16/040,391, dated Mar. 4, 2020, 10 Pages.
Notice Of Allowance received for U.S. Appl. No. 16/040,391, dated Jun. 18, 2020, 5 pages.
Response to Non-Final Office Action filed on Jun. 4, 2020 for U.S. Appl. No. 16/040,391, dated Mar. 4, 2020, 18 Pages.
International Preliminary Report on Patentability received for PCT Application No. PCT/US2018/065644, dated Aug. 27, 2020, 9 Pages.

(56) References Cited

OTHER PUBLICATIONS

International Preliminary Report on Patentability received for PCT Application No. PCT/US2018/065659, dated Aug. 27, 2020, 8 pages.
International Preliminary Report on Patentability received for PCT Application No. PCT/US2018/065670, dated Aug. 27, 2020, 8 pages.
U.S. Appl. No. 16/040,369, "Notice of Allowance", U.S. Appl. No. 16/040,369, dated Jun. 27, 2022, 10 pages.
U.S. Appl. No. 16/040,369, "Supplemental Notice of Allowability", U.S. Appl. No. 16/040,369, dated Sep. 14, 2022, 3 Pages.
Hermanek, Petr, et al., "Optimized reference object for assessment of computed tomography instrument geometry", 7th Conference on Industrial Computed Tomography, Leuven, Belgium (iCT 2017) [retrieved Jul. 11, 2022]. Retrieved from the Internet <https://lirias.kuleuven.be/retrieve/486283>., 2017, 2 pages.

* cited by examiner

GENERATING ATTRIBUTE PREFERENCE MODELS BASED ON DISPARATE ATTRIBUTE SPECTRUMS

PRIORITY APPLICATION

This application claims the benefit of and priority to U.S. application Ser. No. 16/040,391, filed Jul. 19, 2018, the entire contents of which are incorporated herein by reference, and further claims the benefit of and priority to U.S. Provisional Application No. 62/630,192, filed Feb. 13, 2018, the entire contents of which are incorporated herein by reference.

BACKGROUND

Some item subscription services allow users to manually define subscription parameters for pre-scheduling recurring deliveries of predefined items at predefined rates. For example, a family with a toddler may consistently consume two boxes of diapers each month. Since this family knows ahead of time that a specifically identifiable item (e.g., diapers of a particular brand and size) will be consumed at a specific rate (e.g., two boxes per month), a typical item subscription service is well suited for enabling this family to schedule recurring deliveries of diapers. In addition to saving the family time, network traffic is also reduced by obviating the need for this family to manually place orders for each delivery. Thus, some existing item subscription services may improve computing efficiencies by reducing network traffic and decreasing human interaction with computers in association with recurring purchases of specific items that are reliably consumed at a readily discernable rate.

Unfortunately, whatever technical benefits these item subscription services may achieve with respect to recurring purchases of predefined items at predefined rates cannot be similarly obtained with respect to impromptu purchases that span across disparate item categories. This is because existing item subscription services are completely reliant upon users manually setting subscription parameters ahead of time to pre-identify the specific item(s) to be delivered.

It is with respect to these and other considerations that the disclosure made herein is presented.

SUMMARY

Technologies described herein provide a mechanism for generating attribute preference models based on disparate attribute spectrums in order to improve computing efficiencies with respect to impromptu item selections. These attribute preference models enable an attribute correlation system to analyze item sets across a wide variety of disparate "candidate" item categories to preemptively identify individual items for a user, e.g., without the user searching for or otherwise identifying the items. In this way, the disclosed techniques improve computing efficiencies by reducing the amounts of network traffic, processing cycles, and human interaction with computers that typically occurs in association with periodic purchases of items that are not readily identifiable in advance of such purchases and/or that are spread across disparate item categories.

To illustrate this point, it can be appreciated that whenever a user searches for items using a traditional online retailer interface, each individual search query inherently consumes some amount of computing resources (e.g., network bandwidth and/or processing cycles). The disclosed techniques, however, enable preemptive identification of items for the user and thereby obviate any need for this user to enter search queries in association with such items. Thus, the disclosed techniques tangibly improve computing efficiencies with respect to a wide variety of computing resources that would otherwise be consumed and/or utilized absent such preemptive identification. For example, processing cycles are reduced since the user is not required to manually generate search queries in association with the preemptively identified items. Moreover, network traffic is reduced since the number of search queries that are transmitted from the user's computing device is also reduced.

In one illustrative example, an attribute correlation system may analyze interest signals to identify specimens that are of interest to a user. In such an example, analysis of the interest signals may reveal that the user has recently purchased a particular watch and furthermore that the user frequently consumes data associated with a particular car (e.g., by watching online videos and/or reading online content associated with the particular car). The attribute correlation system may also identify attribute spectrums that correspond to the identified specimens. Individual attribute spectrums may define "attribute values" for multiple attributes in association with individual specimens. Exemplary "attributes" include, but are not limited to, a level of craftsmanship prescribed to an individual specimen, a level of quality prescribed to an individual specimen, a level of complexity prescribed to an individual specimen, a scarcity of an individual specimen, a demand for an individual specimen, and a relative price for an individual specimen as compared to other items within a corresponding item category.

Accordingly, exemplary "attribute values" include, but are not limited to, craftsmanship values that are indicative of a user-defined quality of design for individual ones of the specimens, complexity values that are indicative of a level of intricacy for the individual ones of the specimens, scarcity values that are indicative of a limited availability (e.g., within an economic marketplace) for the individual ones of the specimens, demand values that are indicative of a market demand for the individual ones of the specimens, and relative price values for individual ones of the specimens within their respective item categories.

Based on the attribute spectrums for the specimens of interest, the attribute correlation system generates an attribute preference model that indicates the user's "preferred attribute ranges" in association with the multiple attributes. For example, if a distribution of values for a particular attribute is relatively tight (e.g. close together) across the specimens, this may indicate that the user has a strong preference toward items for which the prescribed "attribute value" for this particular attribute falls within a preferred attribute range. Thus, this particular attribute may be determined to be important to the user and weighted accordingly within the attribute preference model. In contrast, if another distribution of values for another attribute is relatively loose (e.g., spread out) across the specimens, this may indicate that the user does not have a discernable preference regarding this other attribute. Therefore, this other attribute may be afforded less weight than the particular attribute within the attribute preference model.

As a specific but nonlimiting example, the attribute correlation system may determine that both the craftsmanship values and the relative price values for the particular watch and the particular car are tightly grouped on their corresponding attribute spectrums. Therefore, the attribute correlation system may assign a relatively higher weight to these attributes than to one or more other attributes. As described herein, the attribute correlation system may deploy the attribute preference model to identify other items for the user which have attribute values which strongly correlate to the specimens of interest.

In some embodiments, the attribute correlation system may also identify one or more candidate "item" categories against which to deploy the attribute preference model in order to select individual items for the user. For example, the attribute correlation system may determine an interest profile corresponding to the user and then use this interest profile to analyze item category data that defines numerous different categories of items. Each category of items may include one or more item sets. Based on this analysis, the attribute correlation system may select one or more categories of items that the user has a high probability of being interested in.

Continuing again with the above example, the attribute correlation system may generate the interest profile for the user based on the interest signals revealing an interest of the user in the particular watch and the particular car. Then, the analysis of the item category data with respect to the interest profile may indicate a high probability of the user being interested in a "men's shoe" item category. For example, a sample of a general populace may indicate that male users that are interested in the particular watch and/or other watches having similar attributes and that are also interested in the particular car and/or other cars having similar attributes have a high probability of being interested in men's shoes which have attributes that strongly correlate to those of the particular watch and the particular car. Resultantly this "men's shoe" item category may be designated by the system as a "candidate" category for the attribute preference model to be applied against.

In various implementations, the "candidate item categories" may include multiple categories of items that are disparate from one another in the sense that one or more predefined relationships are lacking between the candidate categories and/or categories of the specimens of interest. As a specific but non-limiting example, the one or more predefined relationships may include a hierarchical relationship indicating that one item category has a parent-child relationship with another item category within a node structure (e.g., a "watches" category may have a parent-child relationship with a "cell phones, watches, and accessories" category). As another example, the one or more predefined relationships may include a purchase correlation relationship indicating that items from within one item category are frequently purchased along with items from another item category (e.g., items from the "watches" category may frequently be purchases with items from a "watch accessories" category).

In some embodiments, the attribute correlation system may designate one or more item categories as a "candidate item category" based at least in part on these item categories being disparate from the specimens of interest. In other words, an existence of a relationship void (i.e., a lack of the one or more predefined relationships) between a particular category and the specimens of interest may weigh in favor of the particular category being designated as a "candidate item category." In this way, the techniques described herein may facilitate preemptive selection of items that are unrelated to other items that are already owned by the user and/or for which the user has expressly indicated an interest therein (e.g., by browsing through a corresponding item category).

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
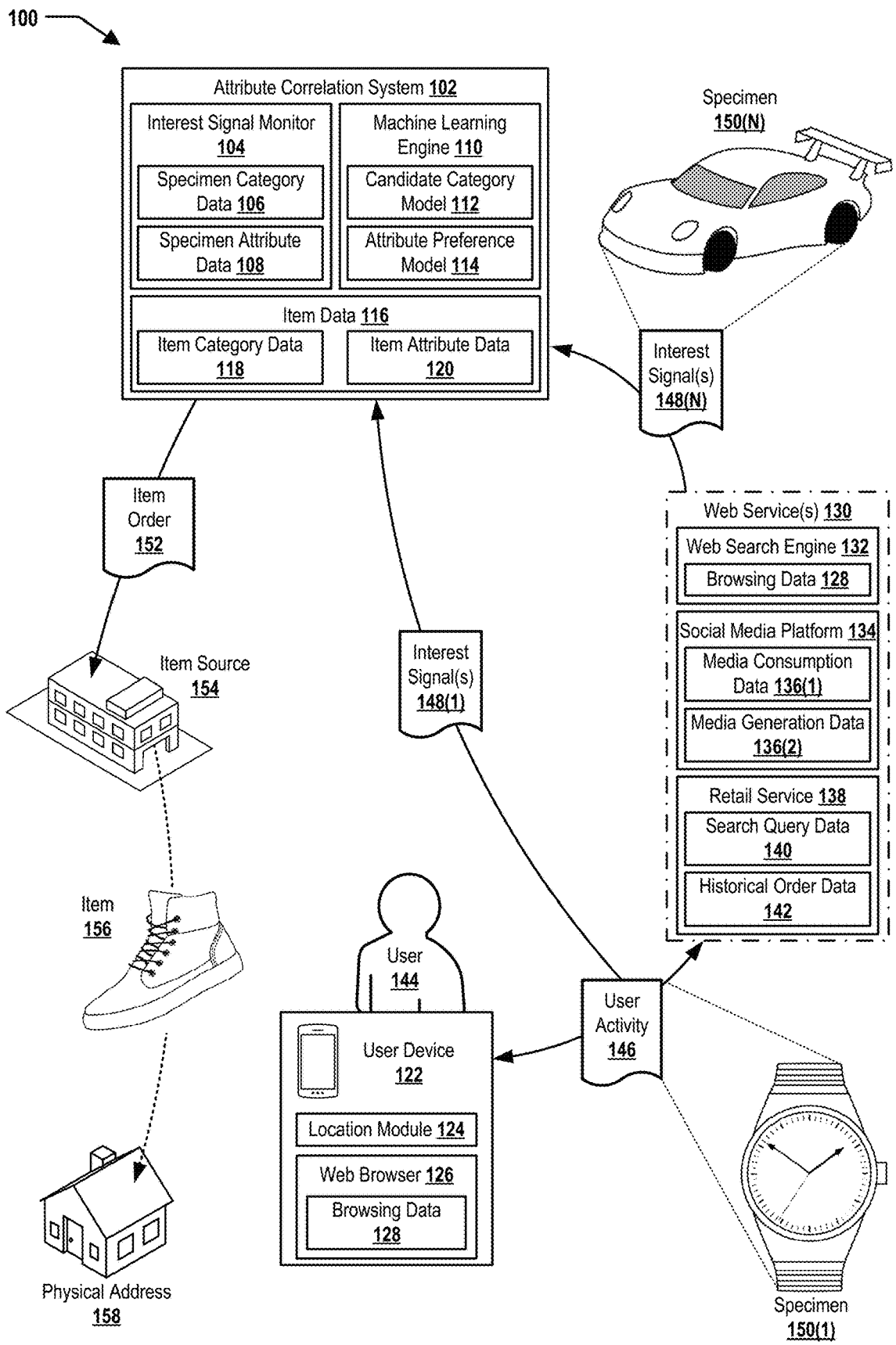
FIG. 1 illustrates is an exemplary system for generating attribute preference models are specific to a user that that facilitate selection of an item for the user from various disparate item categories.

This Detailed Description describes an attribute correlation system that reduces network traffic and processing cycles associated with impromptu item selections by generating attribute preference models based on disparate attribute spectrums and then deploying these attribute preference models to select individual items from various disparate "candidate item categories." Generally described, the attribute preference models facilitate analyzing item sets across a wide variety of disparate "candidate" item categories to preemptively identify individual items for a user. In this way, the individual items may be identified and, ultimately, selected for the user even absent any indication that the user has searched for otherwise identified these items or even other items from within the disparate "candidate" item categories.

In this regard, the disclosed techniques improve efficiencies with respect to a variety of computing resources by, for example, reducing the amounts of network traffic, processing cycles, and human interaction with computers that typically occurs in association with periodic purchases of items that are not readily identifiable in advance of such purchases and/or that are spread across disparate item categories. To illustrate this point, consider that whenever a user searches for items using a traditional online retailer interface, each individual search query inherently consumes some tangible and measurable amount of computing resources (e.g., network bandwidth and/or processing cycles).

By enabling preemptive identification of items for the user, the disclosed techniques obviate any need for this user to enter search queries in association with the preemptively identified items. Thus, the disclosed techniques tangibly and measurably improve computing efficiencies with respect to a wide variety of computing resources that would otherwise be consumed and/or utilized absent such preemptive identification. For example, processing cycles are reduced since the user is not required to manually generate search queries in association with the preemptively identified items. Moreover, network traffic is reduced since the number of search queries that are transmitted from the user's computing device is also reduced.

The disclosed techniques can also reduce computing resource usage under circumstances where a user already intends to select an item (e.g. for purchasing) from within a predefined category. For example, a user may exhibit online behavior that indicates an intention to purchase an item from within a particular item category that includes a very large item set (e.g., hundreds or even thousands of individual items). Under such circumstances, the attribute correlation system described herein may preemptively deploy an attribute preference model (e.g., which has been developed for the user) against the particular item category to identify which item(s) from within this category best match the user's preferences.

Thus, in contrast to traditional online retailer interfaces that encourage the user to continually click through large numbers of items essentially at random (which consumes exorbitant amounts of computing resources), the techniques described herein facilitate expedient identification of an item(s) having attribute spectrums that strongly correlate to the user's preferred attribute ranges. These identified items can then be preemptively purchased for and/or recommended to the user to obviate any desire of the user to continue to randomly browse through the particular item category.

Turning now to FIG. 1, illustrated is an exemplary system 100 for generating attribute preference models 114 that facilitate selection of an item 156 from various disparate item categories. As illustrated, the exemplary system 100 includes an attribute correlation system 102 that is configured to communicate with a user device 122 and one or more web services 130. The attribute correlation system 102 includes an interest signal monitor 104 for analyzing interest signals 148 to identify one or more specimens that are of interest to a user 144. The interest signal monitor 104 may also analyze item attribute data 120 corresponding to the identified specimens 150 to generate specimen attribute data 108 that indicates "attribute values" for one or more "attributes" of the specimens 150.

The attribute correlation system 102 then deploys a machine learning engine 110 to transform the specimen attribute data 108 into an attribute preference model 114 that is usable to preemptively identify an item 156 that has attribute values which strongly correlate to preferences of the user 144. The attribute preference model 114 facilitates analyzing item sets across a wide variety of disparate "candidate" item categories to preemptively identify individual items for the user 144—which may obviate an inclination of the user 144 to browse through an online e-catalog thereby generating exorbitant network traffic. Ultimately, the attribute correlation system 102 may communicate aspects of the item 156 to the user 144 by, for example, generating an item order 152 to cause delivery of the selected item 156 to the user 144.

In various implementations, the attribute correlation system 102 may detect interest signals 148 from a variety of different sources. As illustrated, the interest signal monitor 104 detects first interest signals 148(1) by monitoring user activity 146 (e.g. user activity data) that is associated with one or more web services 130. For example, the user 144 may deploy the user device 122 to interact with a retail service 138 to purchase a first specimen 150(1). As further illustrated, the interest signal monitor 104 receives $N^{th}$ interest signals 148(N) directly from the web services 130. For example, a web search engine 132 may provide the attribute correlation system 102 with browsing data 128 indicating that the user 144 has visited various websites detailing information about an $N^{th}$ specimen 150(N). In the illustrated but nonlimiting example, the first specimen 150 (1) is shown to be a particular watch whereas the $N^{th}$ specimen is shown to be a particular car. Moreover, although illustrated as a "smartphone" style computing device, the user device 122 may be any other suitable computing device such as, for example, a desktop computer, a tablet computer, a laptop computer, etc.

As used herein, the term "specimen" may refer generally to any tangible item (e.g., a consumer product, a building, a musical composition, etc.) that is suitable for studying and/or examining in order to extract information regarding attribute preferences of the user 144. For example, upon identifying tangible items (e.g., the particular watch and the particular car) that the user 144 has exhibited an interest in (e.g., based on the detected the interest signals 148), the attribute correlation system 102 may determine whether the item attribute data 120 includes data specifically associated with these item(s). If such data is available, these item(s) may then be designated as the "specimens" 150 from which specimen attribute data 108 and, ultimately, an attribute preference model 114 is generated.

As a specific but nonlimiting example, the item attribute data 120 may include attribute spectrums (described in more detail with respect to FIG. 2A) for one or more individual specimens 150 including each of the particular watch and the particular car. These attribute spectrums may indicate that the scarcity value of the particular watch is within the top ten percent of an "analog watch" category and that the scarcity value of the particular car is within the top five percent of all commercially available and street legal vehicles. The attribute correlation system 102 may then determine a preferred attribute range of the user 144 for a scarcity attribute. For example, the attribute correlation system 102 may determine that the user 144 prefers items which have a scarcity value within the top ten-percent of all scarcity values from their corresponding item categories.

With specific reference to the first interest signals 148(1), in some embodiments, the interest signal monitor 104 may be configured to monitor user activity 146 corresponding to the user 144 utilizing the user device 122 to request data from and/or transmit data to one or more of the web services 130. For example, the interest signal monitor 104 may monitor network traffic that occurs in one or both directions between the user device 122 and the web services 130. Ultimately, the interest signal monitor 104 may analyze this network traffic to identify one or more specimens of interest to the user 144.

In some implementations, the user activity 146 may be in the form of web browsing data 128 that is generated based on the user 144 deploying the web browser 126 to interact with a web search engine 132. The interest signal monitor 104 may analyze this web browsing data 128 to identify specimens that recur within results of various search strings that the user 144 enters into the web search engine 132. As a specific but nonlimiting example, the interest signal monitor 104 may observe that the user 144 repeatedly enters web searches that are related to the particular car illustrated in FIG. 1. Based on this observation, the interest signal monitor 104 may designate this particular car as a specimen 150 of interest to the user 144 so that item attribute data 120 corresponding to this specimen 150 will be used to compile the specimen attribute data 108—which may ultimately be used to generate the attribute preference model 114. With respect to the foregoing example, it will be appreciated that various implementations which analyze web browsing data and/or other types of user activity may be further configured to garner express and/or implicit informed consent from the user 144 prior to doing so. For example, in various exemplary implementations, a detailed notice may be presented to the user 144 informing the user 144 of the specific types of user activity that will be monitored and/or how the monitored activity will be analyzed and protected from malicious actors (e.g., via encryption, etc.).

In some implementations, the user activity 146 may be in the form of social media consumption data 136(1) that is generated based on the user 144 deploying the web browser 126 and/or a social media application client (not shown) installed on the user device 122 to request social media content that has been posted on a social media platform 134. For example, the interest signal monitor 104 may analyze the social media consumption data 136(1) and determine that the user 144 frequently visits a social media page that is related to the particular car. Then, based on such a determination, the interest signal monitor 104 may designate the particular car as a specimen 150 of interest to the user 144 (e.g., for purposes of generating the attribute preference model 114).

Additionally, or alternatively, the user activity 146 may be in the form of social media generation data 136(2) that is generated based on the user 144 deploying the web browser 126 to generate and post social media content to the social media platform 134. For example, the interest signal monitor 104 may monitor publicly available social media posts, that are made on an account of the user 144, to identify that the user 144 frequently posts content associated with the particular car. For example, the interest signal monitor 104 may analyze a photograph of the user 144 standing in front of the particular car with a caption that states "Got to Sit in this Beauty Today!" By analyzing the photograph, the interest signal monitor 104 may identify that the particular car is in the photograph (e.g., by performing various image analysis/image recognition techniques). By analyzing the caption, the interest signal monitor 104 may determine that the user 144 has expressed positive sentiment toward the particular car. Then, based on such determination(s), the interest signal monitor 104 may designate the particular car as a specimen 150 of interest to the user 144.

In some implementations, the user activity 146 may be in the form of search query data 140 associated with item searches that the user 144 has performed with respect to a retail service 138. For example, search query data 140 may indicate that the user 144 has performed numerous item searches for which a particular specimen 150 has been returned as a result. Additionally, or alternatively, the user activity 146 may be in the form of historical order data 142 that indicates that the user 144 has purchased a particular specimen 150. As a specific but nonlimiting example, the user activity 146 may include search query data 140 indicating that the user 144 performed several searches for which the particular watch was returned as a search result. The user activity 146 may further include historical order data 142 indicating that the user 144 ultimately purchased the particular watch. In this example, the interest signal monitor 104 may designate the particular watch as a specimen 150 of interest to the user 144.

With specific reference to the $N^{th}$ interest signals 148(N), in some embodiments, the interest signal monitor 104 may be configured to communicate directly with the web services 130 to receive and/or detect the interest signals 148 corresponding to the user 144. For example, the interest signal monitor 104 may access information about the user 144 that is publicly available via the web services 130. Such publicly available information may include but is not limited to social media content associated with the user 144, blog content associated with the user 144, or website content associated with the user 144.

Additionally, or alternatively, the interest signal monitor 104 may access information about the user 144 that is stored by the web services 130 for the user 144 but which is not publicly available. For example, the user 144 may provide the interest signal monitor 104 with user credentials corresponding to one or more of the web search engine 132, the social media platform 134, and/or the retail service 138 to enable the interest signal monitor 104 to automatically log into user accounts to harvest information associated with the user 144. For example, the interest signal monitor 104 may use credentials provided by the user 144 to log into the web search engine 132 to access the web browsing data 128 and/or to log into the social media platform 134 to access the social media consumption data 136(1) and/or the social media generation data 136(2) (collectively referred to herein as social media data 136). Then, based on suitable items being identified within the interest signals, the interest signal monitor 104 may designate such items as specimens 150.

Based on a suitable sample size of "designated" specimens 150 (e.g., as identified via the interest signals 148), the interest signal monitor 104 may analyze item data 116 to generate specimen category data 106 indicating one or more item categories that individual ones of the specimens 150 correspond to. For example, the interest signal monitor 104 may determine identifying information for the individual specimens 150 and then analyze item category data 118 based on this identifying information to determine which particular categories of a plurality of categories the individual specimens 150 belong to.

With reference to the specifically illustrated example of FIG. 1, the interest signal monitor 104 may determine first identifying information associated with the particular watch and second identifying information associated with the particular car. The interest signal monitor 104 may also access the item category data 118 which may define a hierarchical structure of categories (e.g., a structure having parent-child relationships between two or more categories). Then, the interest signal monitor 104 may parse the item category data 118 based on the identifying information to determine which categories the particular watch belongs to.

It may be determined, for example, that the particular watch is assigned to an "analog watches" item category which is a child of a "watches" item category, and so on. Continuing to reference the illustrated example, the interest signal monitor 104 may further determine that the particular car is assigned to a "performance vehicles" item category. It can be appreciated, therefore, that in the illustrated example the interest signal monitor 104 may generate specimen category data 106 indicating that the user 144 is interested to some degree in both "analog watches" and "performance vehicles" as well as various other item categories.

Upon generating the specimen category data 106 associated with the user 144, the attribute correlation system 102 may deploy the machine learning engine 110 to utilize the specimen category data 106 to generate a candidate category model 112 corresponding to the user 144. The candidate category model 112 may be generated based on correlations of interests in various disparate item categories that may be observed from a generate populace of persons that are similar in various respects to the user 144. For example, the machine learning engine 110 may access interest profiles associated with a suitable sample of other persons which are similarly situated (in at least some respect(s)) to the user 144.

As a specific but nonlimiting example, if the user 144 is a thirty-seven-year-old single male, the machine learning engine 110 may access interest profiles for a sample set of one-thousand other single males within the age-range of thirty-five to forty. Then, the machine learning engine 110 may identify a subset of this sample set that includes other males within this age range that are also interested to some degree in both "analog watches" and "performance vehicles" (and in some instances other ones of the item categories the user 144 is interested in).

Based on the identified subset, the machine learning engine 110 may generate the candidate category model 112 for use in selecting one or more candidate item categories from which to select items for the user 144. For example, the machine learning engine 110 may determine that ninety-percent of the persons within the identified subset have exhibited an interest in collecting (e.g., obtaining numerous pairs of) men's shoes. In this example, the machine learning engine 110 may determine that this high interest in collecting men's shoes is a characteristic that correlates with the interest in "analog watches" and "performance vehicles" rather than representing an average for the entire sample set. For example, perhaps the percentage of the entire sample set that is interested in collecting "shoes" is only fifteen percent.

In this example, based on the determined correlation, the machine learning engine 110 may determine that users which are interested in both "analog watches" and "performance vehicles" are highly likely to also be interested in collecting shoes. Thus, the machine learning engine 110 may generate and/or adjust the candidate category model 112 to reflect this correlation. In some implementations, the machine learning engine 110 may generate the candidate category models 112 on an individual basis such that an individual model is generated specifically for an individual user 144. Alternatively, or additionally, the candidate category models 112 may be generated for groups of multiple users 144.

Based on the sample of "designated" specimens 150, the interest signal monitor 104 may analyze item data 116 to generate specimen attribute data 108 that indicates "attributes" and "attribute values" therefor corresponding to the specimens 150. For example, as illustrated, the item data 116 may include item attribute data 120 which may define, for numerous different items, attribute values for various different attributes. In some implementations, the item attribute data 120 may define a plurality of attribute spectrums that correspond individually to individual items. That is, individual ones of the attribute spectrums may define "attribute values" for one or more attributes in association with individual specimens.

Exemplary "attributes" include, but are not limited to, a level of craftsmanship prescribed to an individual specimen, a level of complexity prescribed to an individual specimen, a scarcity of an individual specimen, a demand for an individual specimen, and a relative price for an individual specimen as compared to other items within a corresponding item category. Accordingly, exemplary "attribute values" include, but are not limited to, craftsmanship values that are indicative of a user-defined quality of design for individual ones of the specimens, complexity values that are indicative of a level of intricacy for the individual ones of specimens, scarcity values that are indicative of a limited availability (e.g., within an economic marketplace) for the individual ones of the specimens, demand values that are indicative of a market demand for the individual ones of the specimens, and relative price values for individual ones of the specimens within their respective item categories.

The interest signal monitor 104 may parse the item attribute data 120 to compile the specimen attribute data 108. For example, the item attribute data 120 may define attribute spectrums for a large number of items—some of which the user 144 has an interest in (e.g., as indicated by the interest signals 148) and some of which the user 144 has no interest in. Thus, upon determining which items the user 144 is interested in (i.e., identifying the specimens 150), the interest signal monitor 104 may identify specific portions of the item attribute data 120 that corresponds to the specimens 150. Then, these specific portions of the item attribute data 120 may be extracted and used to compile the specimen attribute data 108. Thus, the specimen attribute data 108 is indicative of attribute values that are prescribed to the specimens 150 for the multiple attributes and, therefore, may be usable to discern which specific attributes are of import to the user 144 and what the preferred attribute ranges are for these important attributes.

Then, based on the specimen attribute data 108 that is compiled for the particular user 144, the machine learning engine 110 may generate an attribute preference model 114 that indicates the user's "preferred attribute ranges" in association with the important attributes. For example, if a distribution of values for a particular attribute is relatively tight (e.g. close together) across the specimens 150, this may indicate that the user has a strong preference toward items for which the prescribed "attribute value" for this particular attribute falls within a preferred attribute range. Thus, this particular attribute may be determined to be important to the user and weighted accordingly within the attribute preference model 114. In contrast, if another distribution of values for another attribute is widely dispersed (e.g., spread out) across the specimens, this may indicate that the user does not have a discernable preference regarding this other attribute. Therefore, this other attribute may be afforded less weight than the particular attribute within the attribute preference model 114.

In some implementations, the attribute correlation system 102 may deploy the candidate category model 112 and the attribute preference model 114 in a predefined sequence in order to automatically select an item 156 having attribute values which correspond to the user's 144 preferences from an item category that is disparate from the items categories to which the specimens 150 are assigned. For example, based on one or more trigger criteria, the attribute correlation system 102 may deploy the candidate category model 112 to identify one or more item categories which are likely of high interest to the user 144.

In the specific but nonlimiting example of FIG. 1, the specimen category data 106 (e.g., which indicates which categories the specimens 150 are assigned) may be applied to the candidate category model 112 (e.g., which is generated based on the analysis of the sample set) to output a set of candidate categories which the user 144 has a relatively high probability of being interested in. For example, based on the specimen category data 106 indicating that the user 144 is interested in the "analog watch" category and the "performance vehicle" category and also the candidate category model 112 indicating that persons having such interests are likely to also be interested in collecting "men's shoes," the attribute correlation system 102 may designate the "men's shoes" item category as a candidate category.

Then, once one or more candidate categories have been designated, the attribute correlation system 102 may deploy the attribute preference model 114 against the candidate categories to identify the item 156. In some implementations, the attribute preference model 114 may be applied against multiple different candidate categories and the item 156 may be selected based on having a highest score within the attribute preference model 114 as compared to all the other items within the multiple different candidate categories. For example, the candidate categories may include both the "men's shoe" category and also a "consumer electronics" category and the attribute preference model 114 may used to score each individual item included within these categories in terms of how strongly the attribute values for the individual items correlate to those of the specimens 150. Then, the item 156 may be selected based on its score as compared to the other individual items within these categories. Stated alternatively, the attribute preference model 114 may be applied against multiple different and disparate candidate categories to select one or more individual item from across these different and disparate candidate categories.

The selected item(s) may be those which best matches the preferred attribute ranges of the user 144. In this way, the attribute correlation system 102 may select item(s) for the user 144 preemptively (e.g., without the user searching for or otherwise identifying items from with these candidate categories). Moreover, the attribute correlation system 102 may identify items for users from categories that are disparate from any other category of item which attribute correlation system 102 is even able to discern that the user 144 has directly expressed an interest in. For example, in the scenario illustrated in FIG. 1, the user 144 has not directly expressed an interest in the "men's shoes" category but nevertheless the attribute correlation system 102 has designated this as a candidate category based on other categories that the user 144 has expressed an interest in.

In some implementations, the attribute correlation system 102 may determine when the user 144 intends to make a purchase from a particular category within the near future and, based on such a determination, apply the attribute preference model 114 against this particular category to select the item 156. For example, the search query data 140 may reveal an intention of the user to acquire an item from a particular category. More specifically, the search query data 140 may reveal correlations between searching behavior (e.g., behavior exhibited by the user while browsing through categories) and item purchasing behavior exhibited by the user 144 as indicated within historical order data 142. For example, the machine learning engine 110 may analyze the search query data 140 (which may include both current search queries as well as historical search queries) with respect to the historical order data 142 to determine that roughly ninety-five percent ("95%") of the times in which the user 144 has viewed six ("6") or more items within a specific item category during a two-day window of time, the user 144 has shortly thereafter purchased an item from that specific category. Thus, under these specific circumstances, the machine learning engine 110 may observe from the search query data 140 that the user 144 has viewed six or more individual pairs of shoes within a "men's wearable accessories" item category and based on this observation determine that there is a ninety-five percent ("95%") chance that the user 144 intends to purchase some wearable accessory item in the near future.

Then, the attribute correlation system 102 may deploy the attribute preference model against this "men's wearable accessories" item category to identify a particular item 156 that best matches the preferred attribute ranges of the user 144. As a specific but nonlimiting example, the attribute correlation system 102 may determine that both of the craftsmanship values and the relative price values for the specimens 150 are tightly grouped on their corresponding attribute spectrums.

Thus, by applying the attribute preference model 114 to the "men's wearable accessories" item category, the attribute correlation system 102 may identify whichever individual item from within this category is best suited to match the tastes of the user 144. In this way, the attribute correlation system 102 may identify items for users from categories that the user intends to make a purchase from preemptively so that the user 144 is not inclined to continuously and randomly browse through the category—which results in exorbitant amounts of networking traffic and search queries which would otherwise need to be processed.

In some implementations, the attribute correlation system 102 may cause the identified items 156 to be preemptively delivered to the user 144. For example, the attribute correlation system 102 may transmit an item order 152 to an item source 154 to cause the item source 154 to package and ship the item 156 to a physical address 158 (e.g., a home and/or office) associated with the user 144.

Figure 2A:
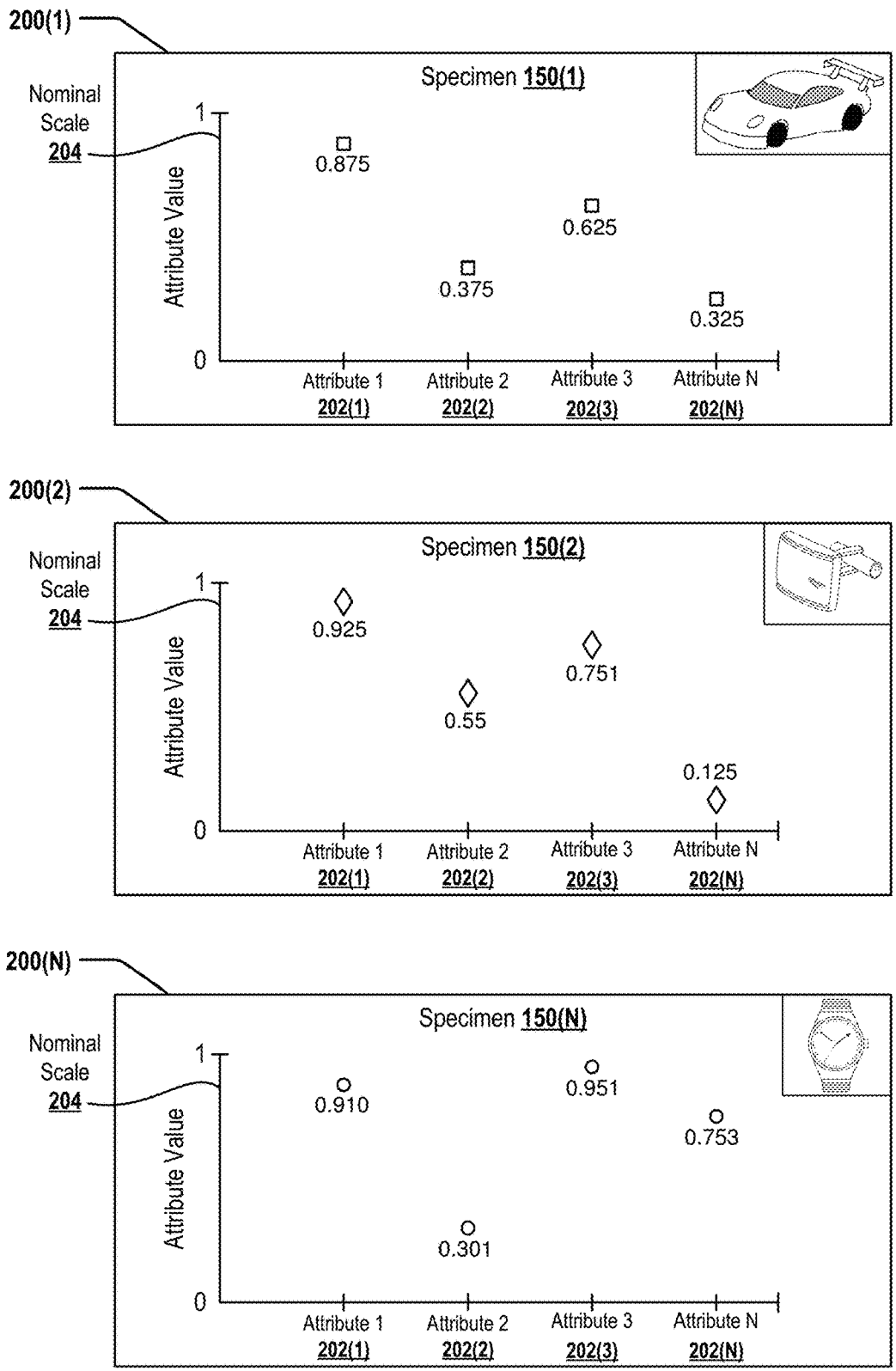
FIG. 2A illustrates exemplary item attribute data that is arranged in the form of attribute spectrums that individually correspond to individual items of a plurality of items.

Turning now to FIG. 2A, illustrated is exemplary item attribute data 120 that is arranged in the form of attribute spectrums 200 that individually correspond to individual items of a plurality of items. As illustrated, the item attribute data 120 includes a first attribute spectrum 200(1) that corresponds to the first specimen 150(1), a second attribute spectrum 200(2) that corresponds to a second specimen 150(2), and an $N^{th}$ attribute spectrum 200(N) that corresponds to the $N^{th}$ specimen 150(N). In this example, each individual attribute spectrum defines attribute values for each of a first attribute 202(1) through an $N^{th}$ attribute 202(N).

Figure 2B:
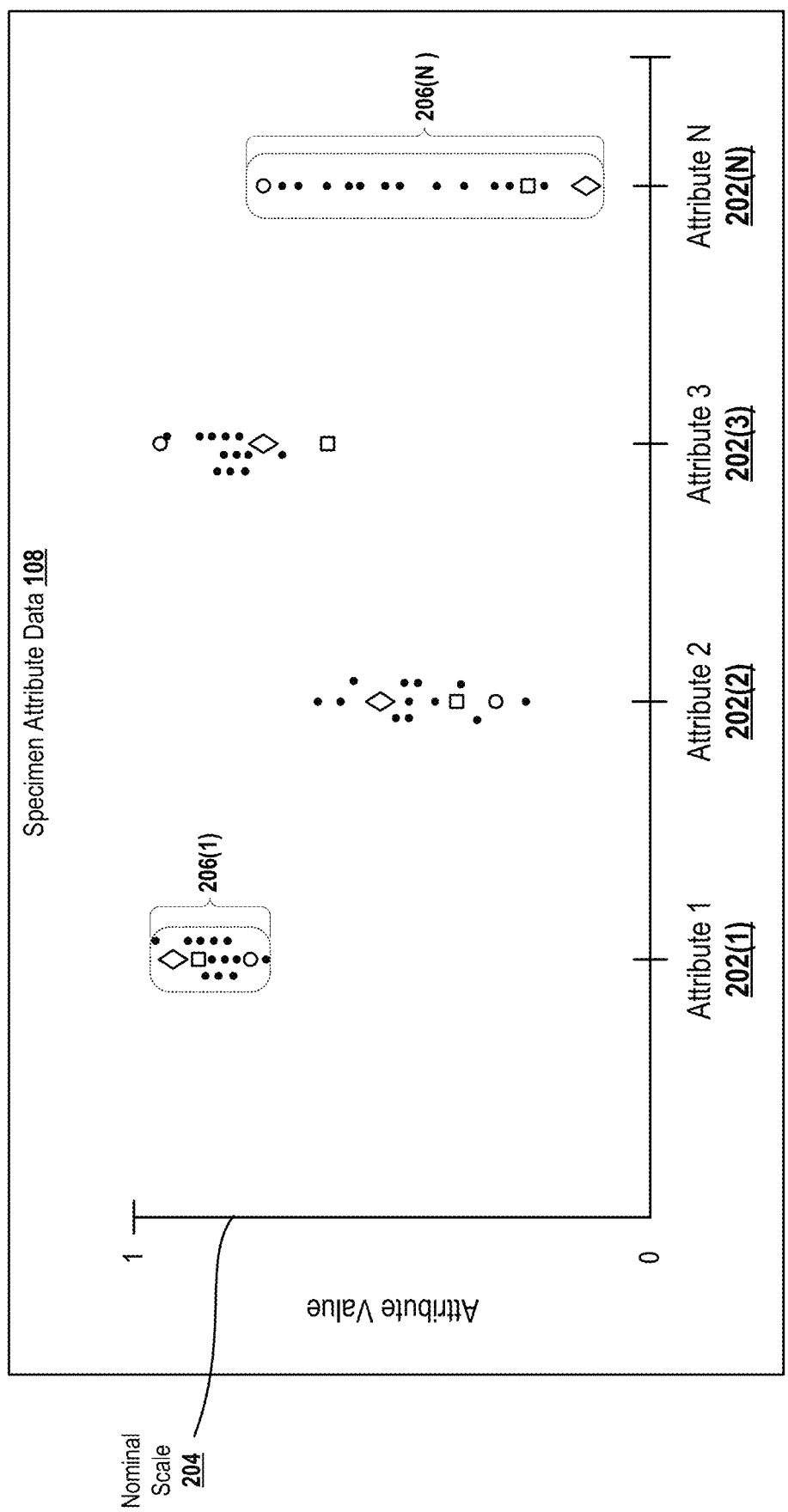
FIG. 2B illustrates exemplary specimen attribute data that is generated by compiling specific portions of the item attribute data of FIG. 2A.

Although each of the attribute spectrums illustrated in FIG. 2A correspond to items that have been designated as specimens 150, it can be appreciated that the item attribute data 120 further includes data (e.g., attribute spectrums) associated with numerous other items—some of which are not specimens 150 of interest to the user 144. In FIGS. 2A and 2B, the attribute values for the first specimen 150(1) are graphically shown as squares, the attribute values for the second specimen 150(2) are graphically shown as diamonds, and the attribute values for the $N^{th}$ specimen 150(N) are graphically shown as circles.

In some implementations, the attribute values are normalized within the attribute spectrums such that attribute values that are measured across different scales of measurement may be transformed to a notionally common scale. For example, each of a "price attribute" indicating how much individual specimens 150 cost and also a "scarcity attribute" indicting an availability (or lack thereof) of the individual specimens 150 may be commonly represented on a nominal attribute value scale. In the illustrated example, the attribute values for any individual specimen 150 are normalized to a nominal scale 204 of zero to one with respect to the set of items that coexist within a particular item category of the individual specimen 150. Based on such a normalized attribute scale, an individual specimen that is the most expensive item within a particular category may be prescribed a "relative price" attribute value of one ("1") whereas another individual specimen that is more expensive than only ten percent of items within the particular category may be prescribed a "relative price" attribute value of point-one ("0.1").

In the specifically illustrated but nonlimiting example, the first specimen 150(1) is the particular car of FIG. 1 and is prescribed a normalized value of 0.875 for the first attribute, a normalized value of 0.375 for the second attribute 202(2), and so on. In this example, the second specimen 150(2) is illustrated as a men's cufflink and is prescribed a normalized value of 0.925 for the first attribute 202(1), and so on. In this example, the $N^{th}$ specimen 150(N) is the particular watch of FIG. 1 and is prescribed a normalized value of 0.910 for the first attribute 202(1), and so on.

Turning now to FIG. 2B, illustrated is exemplary specimen attribute data 108 that is generated by compiling specific portions of the item attribute data 120. In general, the portions of the item attribute data 120 used to compile the specimen attribute data 108 correspond to items that are designated as specimens 150 of interest to the user 144. As illustrated, the exemplary specimen attribute data 108 includes the attribute values for the first, second, and Nth specimens (graphically illustrated as the squares, diamonds, and circles, respectively) as well as other attribute values for numerous other specimens 150.

In various implementations, the machine learning engine 110 may generate the attribute preference model 114 for the user 144 based at least in part on attribute value distributions 206 corresponding to individual attributes 202. For example, with specific reference to the first attribute 202(1), it can be appreciated based on a first attribute value distribution 206(1) that the attribute values of the specimens 150 for the first attribute 202(1) are grouped relatively tight at an upper end of the nominal scale 204. That is, the first attribute value distribution 206(1) is relatively smaller than other attribute value distributions 206 for other attributes 202. Moreover, with specific reference to the $N^{th}$ attribute 202(N), it can be appreciated based on an $N^{th}$ attribute value distribution 206(N) that the attribute values of the specimens 150 for the $N^{th}$ attribute 202(N) are grouped relatively loosely across the nominal scale 204. In various implementations, the individual attribute value distributions 206 may be used to represent preferred attribute ranges in association with individual attributes 202.

In some implementations, the machine learning engine 110 may assign varying weights to the individual attributes 202 within the attribute preference model 114 based on the attribute value distributions 206. For example, since the first attribute value distribution 206(1) is relatively tight at the upper end of the nominal scale 204, it can be appreciated that the user 144 has exhibited a preference towards items for which the values prescribed to this first attribute 202(1) are relatively high within whatever item category those items are assigned.

As a specific but nonlimiting example, if the first attribute 202(1) is a "relative price" attribute, then it can be appreciated that the user 144 tends to be interested in (e.g., prefer) items that are priced relatively higher than other items within its corresponding category. In contrast, since the $N^{th}$ attribute value distribution 206(N) is spread widely across the nominal scale 204, it can be appreciated that the user 144 has not exhibited a similar preference for items having any particular value and/or range of values prescribed to the $N^{th}$ attribute 202(N).

Accordingly, based on the exemplary specimen attribute data 108 a resulting attribute preference model 114 may include a first weight that is assigned to the first attribute 202(1) and an $N^{th}$ weight that is assigned to the $N^{th}$ attribute, wherein the first weight is greater than the $N^{th}$ weight. In this way, deploying the attribute preference model 114 to select an item for the user 144 may result in identification of an individual item for which a prescribed value for the first attribute 202(1) falls within the first attribute value distribution 206(1). At the same time, identification of the individual item may place little or no regard to what value is prescribed to the $N^{th}$ attribute.

In various implementations, the machine learning engine 110 may assign varying weights to the individual attributes 202 within the attribute preference model 114 based on standard deviations of the attribute value distributions 206. For example, the weights that are assigned to any particular attribute may be inversely proportional to the standard deviations of the attribute values for that particular attribute across all specimens 150. In this way, the more a user exhibits a tendency toward items having any particular characteristic in association with an attribute 202, the more that attribute will be weighed in selecting an item 156 for the user 144.

Figure 3:
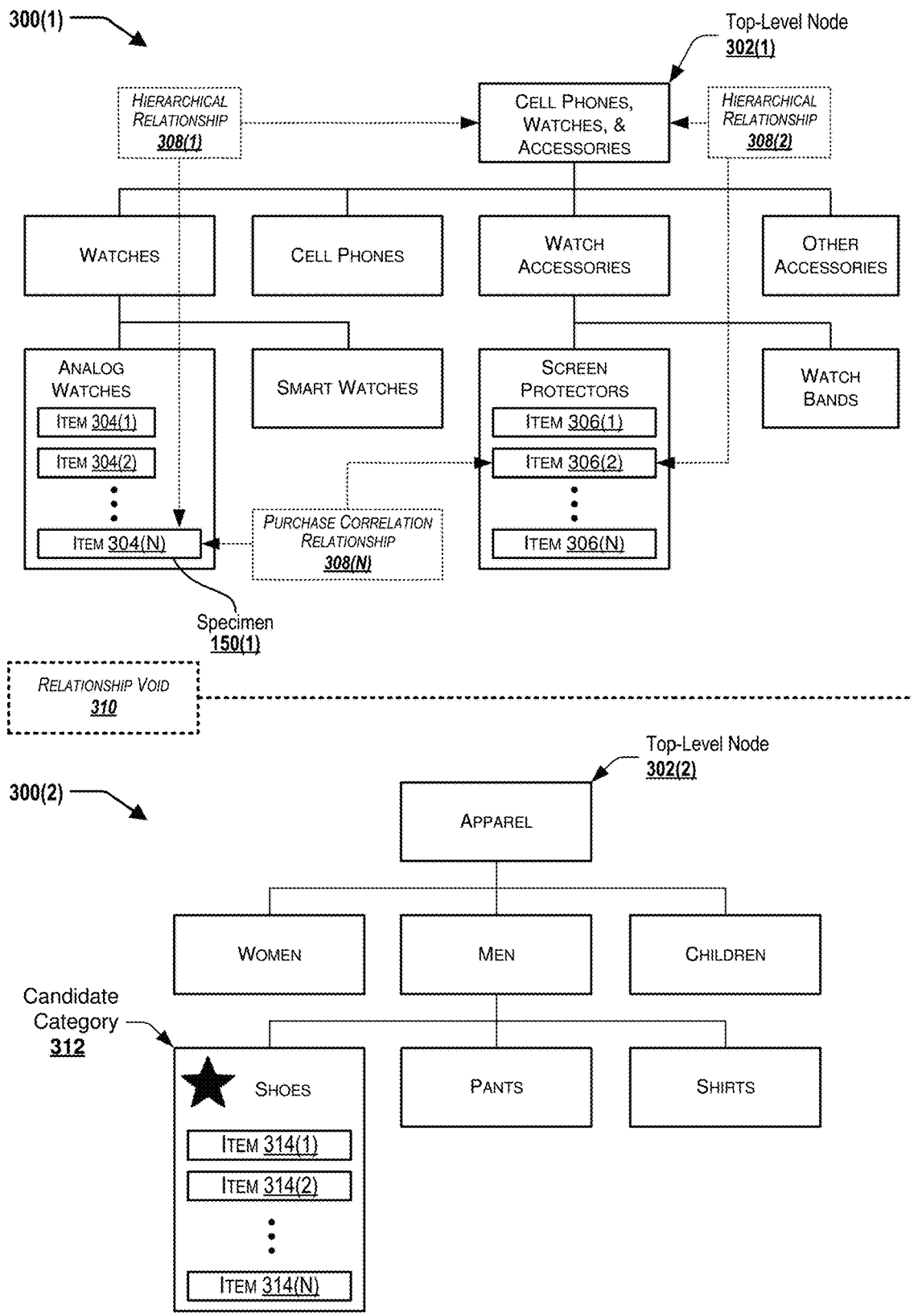
FIG. 3 illustrates exemplary item category data that defines one or more hierarchical structures of categories.

Turning now to FIG. 3, illustrated is exemplary item category data 118 that defines one or more hierarchical structures 300 of categories. In the specifically illustrated example, the item category data 118 defines a first hierarchical structure 300(1) that includes a first top-level node 302(1) and a second hierarchical structure 300(2) that includes a second top-level node 302(2). More specifically, in this example, the first hierarchical structure 300 includes a "Cell Phones, Watches, & Accessories" category that serves as the first top-level node 302(1) along with a plurality of other categories that are organized below the first top-level node 302(1).

In various implementations, the item category data 118 may define one or more relationships 308 between individual items and/or categories of items. For example, as illustrated, the first hierarchical structure 300(1) defines a first relationship 308(1) through an $N^{th}$ relationship. Here, the first relationship 308(1) is a hierarchical relationship between an item 304(N), that is assigned to an "analog watches" item category, and the first top-level node 302(1). Similarly, the second relationship 308(2) is a hierarchical relationship between an item 306(2), that is assigned to a "screen protectors" item category, and the first top-level node 302(1). As used herein, the term "hierarchical relationship" may refer to any relationship that interconnects items and/or item categories within a particular hierarchical structure 300. The $N^{th}$ relationship 308(N) is a purchase correlation relationship between the item 304(N) and the item 306(2). For example, the item 306(2) may be a particular screen protector that is designed (e.g., in terms of size, shape, etc.) to fit specifically on the item 304(N) which is a particular watch. Thus, persons who have purchased the item 304(N) may tend to also purchase the item 306(2).

For purposes of the present discussion, presume that the item 304(N) is the particular watch of FIG. 1 which has been designated as the first specimen 150(1) based on the first interest signals 148(1). Further presume that the "shoes"

item category of the second hierarchical structure 300(2) has been designated as a candidate category 312 from which to potentially select one or more individual items 314 for the user 144 based on the attribute preference model 114. As illustrated, in various implementations, the candidate category 312 may be disparate from the individual specimens 150 (and/or item categories thereof) in the sense that a relationship void 310 separates the candidate category 310 from the individual specimens (and/or item categories thereof).

As used herein, the term "relationship void" may refer generally to a lack of one or more predefined relationships 308 between two or more items and/or item categories thereof. As a specific but nonlimiting example, a particular item category may be aptly described as being disparate from another item category based on an absence of both a purchase correlation relationship and a hierarchical relationship existing between these item categories. In some instances, a hierarchical relationship may be deemed as lacking between two item categories when such item categories are assigned into their respective hierarchical structures 300 under different top-level nodes 302.

Figure 4A:
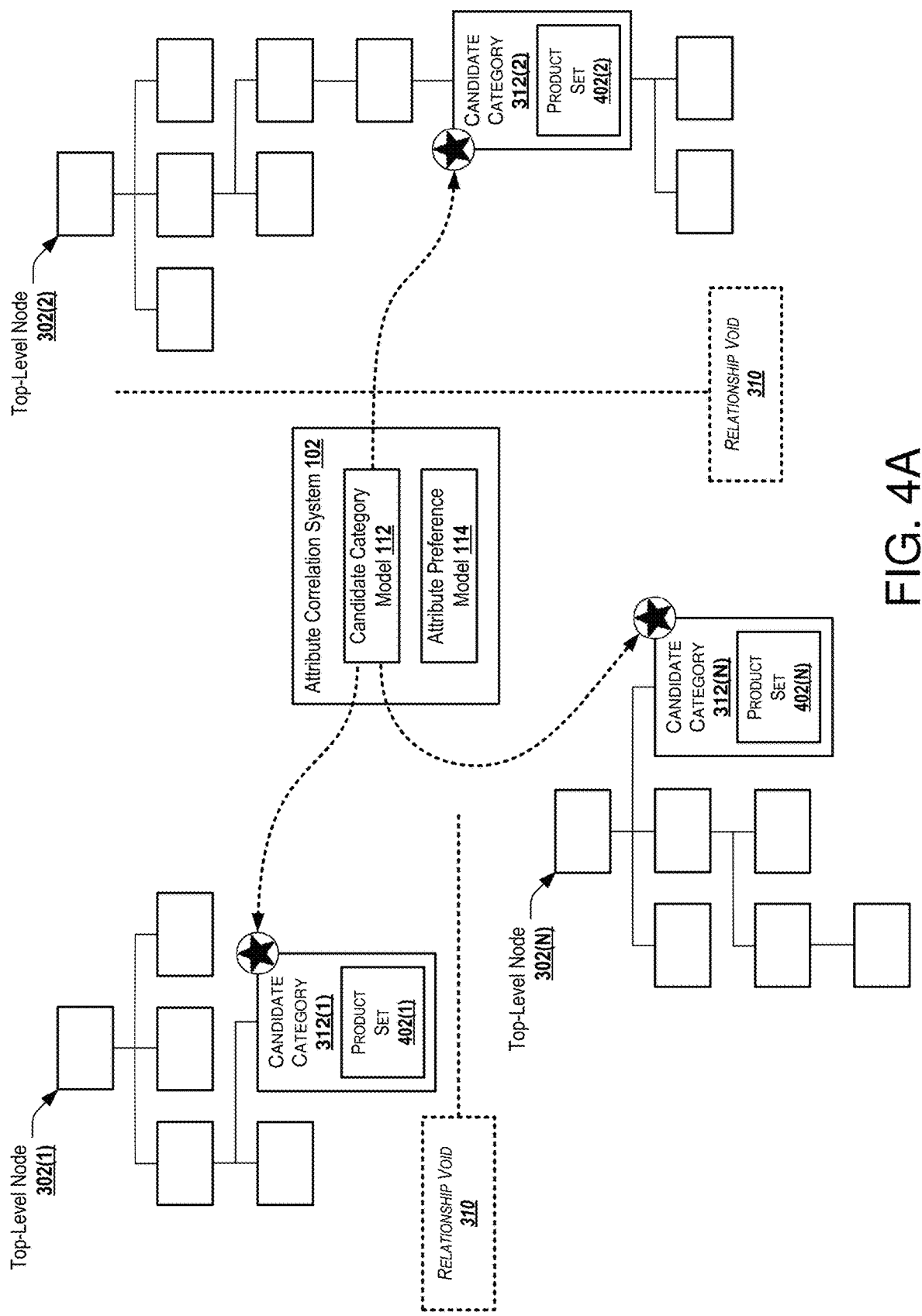
FIG. 4A illustrates a system for deploying a candidate category model against a plurality of different hierarchical structures to designate one or more item categories as "candidate" categories.

Turning now to FIG. 4A, the attribute correlation system 102 is illustrated as deploying the candidate category model 112 against a plurality of different hierarchical structures 300 to designate one or more item categories as "candidate" categories 312. For example, based on the candidate category model 112, the attribute correlation system 102 may deploy the candidate category model 112 against the item category data 118 to identify one or more item categories which are likely of high interest to the user 144. As illustrated in FIG. 4A, a plurality of different item categories have been designated as "candidate" item categories as indicated by the black stars. Individual designated candidate categories 312 may include individual product sets 402 that include one or more items as defined by the item data 116.

As illustrated, in some implementation, the designated candidate categories 312 may be disparate from one another in the sense that one or more relationship voids 310 isolate the candidate categories 312 from one another. For example, one individual candidate category 312 may be disparate from the other candidate categories 312 in the sense that the individual candidate category 312 is assigned under a different top-level node 302 that the other candidate categories 312.

Figure 4B:
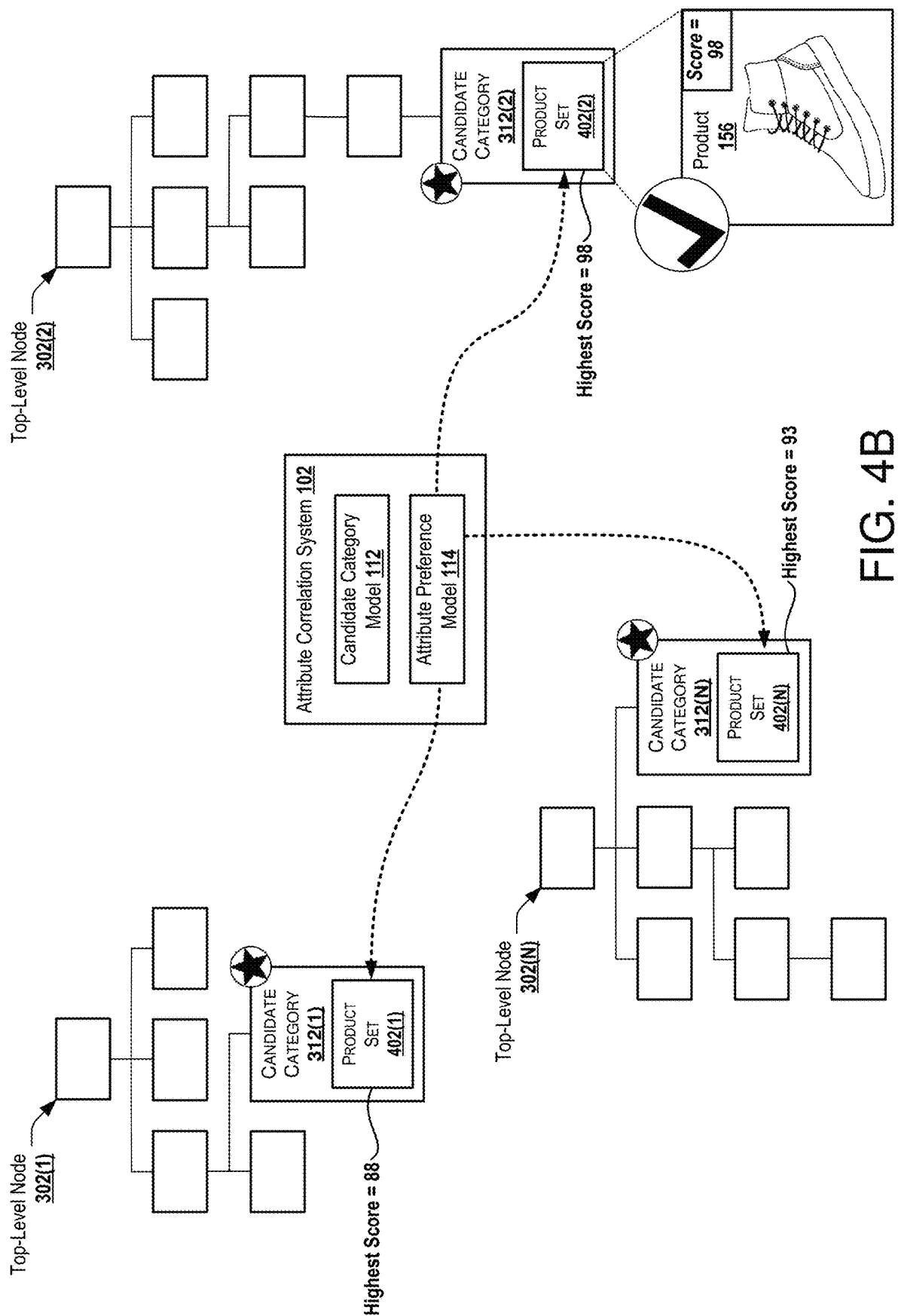
FIG. 4B illustrates a system for deploying an attribute preference model against those specific item categories which were previously designated as "candidate" categories.

Turning now to FIG. 4B, the attribute correlation system 102 is illustrated as deploying the attribute preference model 114 against those specific item categories which were previously designated as candidate categories 312. It can be appreciated, therefore, that in various implementations the techniques described herein may include deploying one or more machine learning engines 110 to generate multiple different models (e.g., the candidate category model 112 and the attribute preference model 114) which are then separately and sequentially deployed to select the item 156 for the user 144.

It should be appreciated that any appropriate machine learning techniques may also be utilized, such as unsupervised learning, semi-supervised learning, classification analysis, regression analysis, clustering, etc. One or more predictive models may also be utilized, such as a group method of data handling, Naïve Bayes, k-nearest neighbor algorithm, majority classifier, support vector machines, random forests, boosted trees, Classification and Regression Trees (CART), neural networks, ordinary least square, and so on.

In some implementations, the attribute correlation system 102 may utilize the attribute preference model 114 to score the individual items within the product sets 402 of the candidate categories 312. Then, the attribute correlation system 102 may select one or more items based on their scores. In the illustrated example, the attribute correlation system 102 selects a single item from the candidate categories 312 based on this single item having the highest score. Here, the highest scored item from the first product set 402(1) received a score of 88, the highest scored item from the second product set 402(2) received a score of 98, and the highest scored item from the $N^{th}$ product set 402(N) received a score of 93. Thus, the item 156 with the score of 98 is illustrated as being selected for the user 144.

In some implementations, the attribute correlation system 102 may select individual items for the user 144 responsive to a score for the individual items reaching or exceeding a threshold level. For example, under circumstances where such a threshold level is set to 90, the attribute correlation system 102 may select each item having a score of 90 or above being assigned thereto based on the attribute preference model 114. Thus, applying such a threshold to the scenario illustrated in FIG. 4B would result in both of the item 156 that is scored 98 and the item scored 93 being selected for the user 144.

Figure 5:
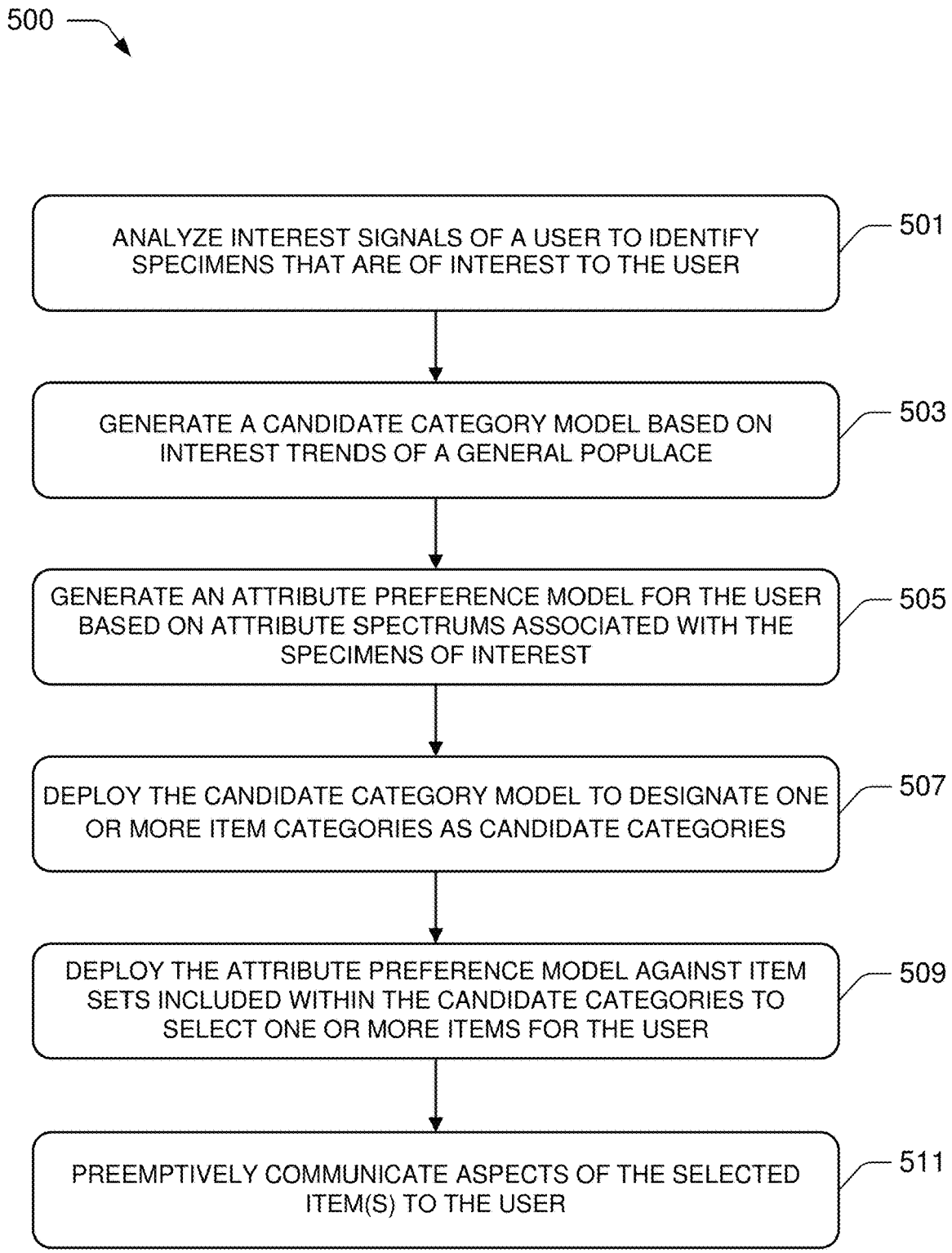
FIG. 5 is a flow diagram that illustrates an example process of preemptively selecting items for a user by sequentially deploying multiple machine learning models.

FIG. 5 illustrates a flow diagram in association with an example process 500 which is described with reference to FIGS. 1-4B. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

Turning now to FIG. 5, a flow diagram illustrates an example process 500 of preemptively selecting items for a user by sequentially deploying multiple machine learning models. At block 501, an attribute correlation system 102 may analyze interest signals that are received from one or more sources to identify specimens that are of interest to the user. For example, as described with respect to FIG. 1, the attribute correlation system 102 may receive interest signals from a user device 122 (e.g., by analyzing user activity 146) and/or directly from one of more web services 130. As a specific but non-limiting example, the attribute correlation system 102 may analyze web browsing activity of the user to determine that the user is interested in the particular car and may further analyze order history data to determine that the user is interested in the particular watch (both shown in FIG. 1).

At block 503, the attribute correlation system 102 may generate a candidate category model. In some implementations, the candidate category model may be generated based on interest trends of a general populace of persons that are in at least some respect similar to the user. For example, a sample of a general populace may indicate that male users that are interested in the particular watch and/or other watches having similar attributes and that are also interested in the particular car and/or other cars having similar attributes have a high probability of being interested in shoes having attributes which strongly correlate to those of the particular watch and the particular car. Resultantly this "men's shoe" item category may be designated by the system as a "candidate" category for the attribute preference model to be applied against.

At block 505, the attribute correlation system 102 may generate an attribute preference model for the user based on first attribute spectrums associated with the specimens of interest. For example, as described in relation to FIG. 2A, item attribute data 120 may include attribute spectrums associated with the individual specimens of interest 150. Compiling these individual attribute spectrums into specimen attribute data as shown in FIG. 2B, it can be appreciated that various preferred attribute ranges of the user 144 for individual attributes 202 may be revealed. Moreover, attribute value distributions 206 as described in relation to FIG. 2B may be indicative of a strength of the user's preference for items that match the preferred attribute ranges for any particular attribute 202. For example, based on the first attribute value distributions 206(1) being tighter than the $N^{th}$ attribute value distributions 206(N), the attribute preference model may be generated in a manner so as to provide more weight to the first attribute 202(1) than the $N^{th}$ attribute 202(N).

At block 507, the attribute correlation system 102 may deploy the candidate category model against the item data 116 to designate one or more item categories as candidate categories 312. As described in relation to FIG. 3, in various implementations, one or more of the candidate categories 312 may be disparate from the specimens 150 of interest. Additionally, or alternately, as described in relation to FIG. 4A, one or more of the candidate categories 312 may be disparate from other candidate categories. Stated alternatively, in various implementations, one or more predefined relationships may be lacking between the candidate categories 312 and the specimens 150 and/or other candidate categories 312.

In some implementations, one or more particular candidate categories 312 may be selected based on a determination that these particular candidate categories are disparate from the specimens of interest identified at block 501. Stated alternatively, selection of the particular candidate categories may be contingent upon one or more predefined relationships lacking between these particular candidate categories and the specimens of interest. As a specific but nonlimiting example, the particular candidate categories may be selected if, and only if, it is determined that no purchase correlation relationship and no hierarchical relationship exists between the candidate category and the specimens of interest.

At block 509, the attribute correlation system 102 may deploy the attribute preference model against item sets that are included within the candidate categories to select one or more items for the user. Deploying the attribute preference model may include analyzing a plurality of second attribute spectrums that correspond to the individual items within the item sets of the candidate categories. In some implementations, the attribute correlation system 102 may rank the plurality of second attribute spectrums (e.g., of the "candidate" items) in accordance with their correlative strength to the first attribute spectrums of the specimens 150. For example, individual ones of the second attribute spectrums which strongly correlate to the preferred attribute ranges observed from the first attribute spectrums may be ranked above other second attribute spectrums that more loosely correlate (or do not correlate at all) to the first attribute spectrums).

At block 511, the attribute preference system 102 may preemptively communicate aspects of the selected items to the user 144. For example, the attribute preference system 102 may cause a preemptive delivery of the selected item to the user 144 as described in relation to FIG. 1. Additionally, or alternatively, the attribute preference system 102 may preemptively transmit a recommendation of the selected item to the user.

In some implementations, the attribute preference system 102 may generate a notification that includes an indication that the preemptive delivery has been scheduled for some future time (e.g., two days after generation of the notification). In this way, the user will become aware of the item being selected prior to actually receiving the preemptive delivery of the item. In some instances, the notification may include a user interface element that enables the user to cancel the preemptive delivery. For example, the notification may cause the user device 122 to display information associated with the selected item (e.g., a picture of the selected item and/or a description of the selected item) along with an indication that the selected item is scheduled to be delivered absent contrary instructions being received from the user.

The notification may further display a "cancel order" user-interface elements (e.g., a button, etc.) that the user may select in order to cause the user device to generate and transmit cancellation data to the attribute correlation system 102 and/or the item source 154. Upon receipt of the cancellation data, the attribute correlation system 102 and/or the item source 154 may respond by cancelling the preemptive delivery of the selected item to the physical address of the user.

Figure 6:
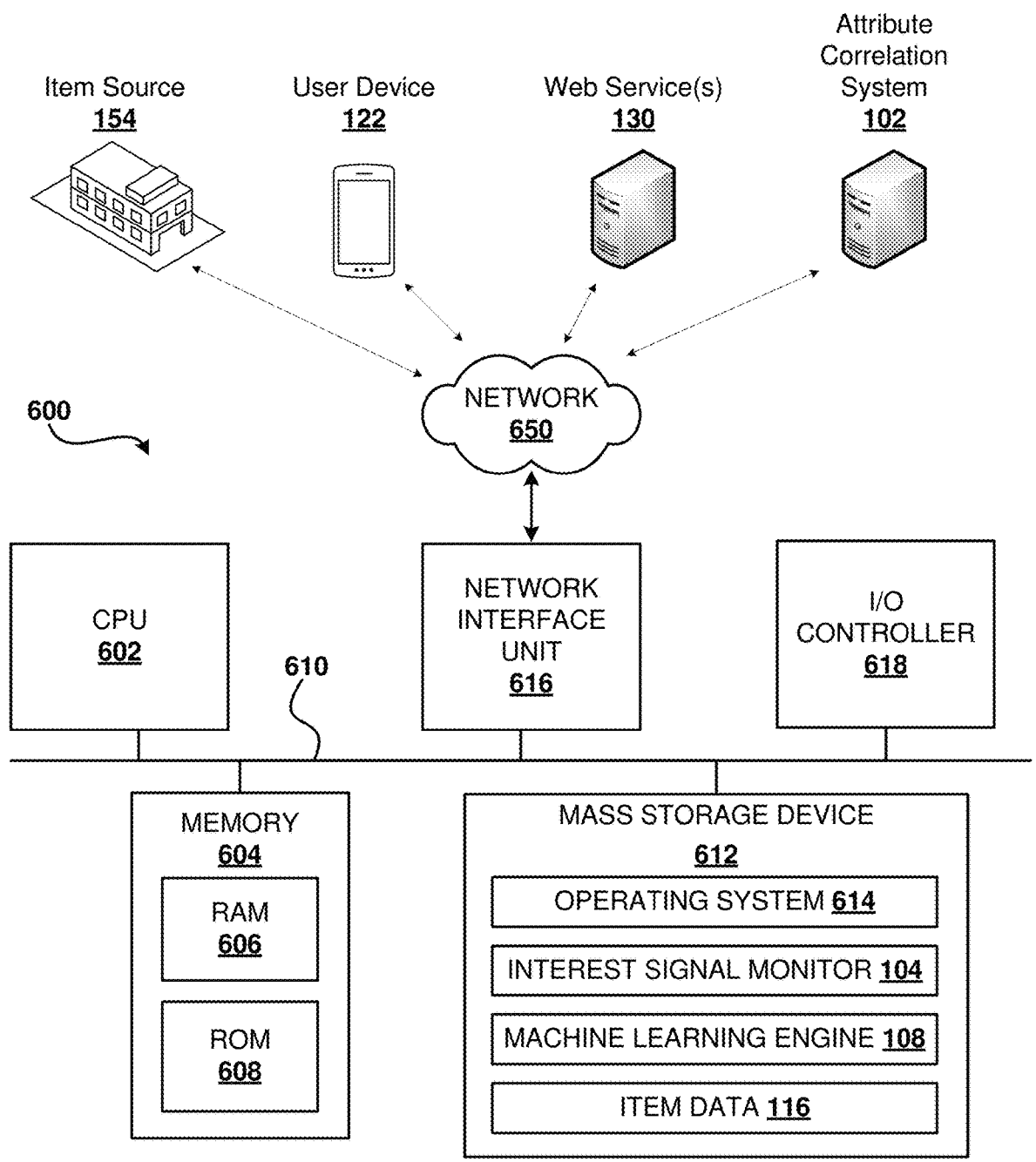
FIG. 6 shows additional details of an example computer architecture for a computer capable of executing the functionalities described herein.

FIG. 6 shows additional details of an example computer architecture for a computer capable of executing the functionalities described herein such as, for example, those described with reference to the attribute correlation system 102, or any program components thereof as described herein. Thus, the computer architecture 600 illustrated in FIG. 6 illustrates an architecture for a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the interest signal monitor 104, the machine learning engine 110, and/or the item data 116.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various techniques, the computer architecture 600 may operate in a networked environment using logical connections to remote computers through a network 650 and/or another network (not shown). The computer architecture 600 may connect to the network 650 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 650 through a network interface unit 616, the computing architecture may enable the attribute correlation system 102, the user device 122, the web service(s) 130, and/or the item source 154 to communicate with one another.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

CONCLUSION

In closing, as described above, the disclosed techniques enable preemptive identification of items for the user and thereby obviate any need for this user to enter search queries in association with such items. In this way, the disclosed techniques tangibly improve computing efficiencies with respect to a wide variety of computing resources that would otherwise be consumed and/or utilized absent such preemptive identification. For example, whenever a user searches for items using a traditional online retailer interface, each individual search query inherently consumes some amount of computing resources (e.g., network bandwidth and/or processing cycles). By implementing the disclosed techniques, processing cycles are reduced since the user is not required to manually generate search queries in association with the preemptively identified items. Moreover, network traffic is reduced since the number of search queries that are transmitted from the user's computing device is also reduced.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
   identifying preferred attribute value ranges for a user based on at least one first attribute spectrum that defines first values for one or more attributes of at least one tangible item of interest to the user;
   generating, based on the preferred attribute value ranges for the user, an attribute preference model in association with the user;
   selecting a candidate item category from a plurality of item categories each defined with item category data, wherein the candidate item category includes a plurality of candidate tangible items;
   determining at least one second attribute spectrum that defines second values for the one or more attributes of each of the plurality of candidate tangible items in the candidate item category;
   analyzing the at least one second attribute spectrum based on the attribute preference model to designate a selected tangible item of the plurality of candidate tangible items; and
   communicating the selected tangible item to the user.

2. The computer-implemented method of claim 1, wherein the analyzing the at least one second attribute spectrum based on the attribute preference model includes deploying the attribute preference model to rank individual second attribute spectrums of the at least one second attribute spectrum in accordance with correlative strengths to individual first attribute spectrums of the at least one first attribute spectrum that define the first values for the one or more attributes in association with individual tangible items of interest.

3. The computer-implemented method of claim 1, wherein the candidate item category is disparate from the at least one tangible item of interest with respect to the item category data.

4. The computer-implemented method of claim 1, further comprising:
   determining that the candidate item category is disparate from the at least one tangible item of interest based on a relationship void between the candidate item category and the at least one tangible item of interest within the item category data.

5. The computer-implemented method of claim 4, wherein the relationship void corresponds to the item category data lacking a hierarchical relationship between the candidate item category and the at least one tangible item of interest.

6. The computer-implemented method of claim 1, wherein the generating the attribute preference model based on the preferred attribute value ranges for the user comprises:
   determining a plurality of attribute value distributions of the first values with respect to the at least one first attribute spectrum; and
   assigning weights to individual attributes of the one or more attributes based on the plurality of attribute value distributions, wherein the weights are inversely related to deviations of the plurality of attribute value distributions.

7. The computer-implemented method of claim 1, wherein the first values for the one or more attributes comprise at least one of:
   craftsmanship values that are indicative of a user-defined quality of design for individual tangible items of interest;
   complexity values that are indicative of a level of intricacy for the individual tangible items of interest;
   scarcity values that are indicative of a limited availability for the individual tangible items of interest; or
   demand values that are indicative of a market demand for the individual tangible items of interest.

8. The computer-implemented method of claim 1, wherein the analyzing the at least one second attribute spectrum includes scoring a plurality of individual tangible items within the candidate item category based on the attribute preference model.

9. The computer-implemented method of claim 1, further comprising generating an item order to schedule a preemptive delivery of the selected tangible item to a physical address that corresponds to the user.

10. The computer-implemented method of claim 1, wherein the at least one tangible item of interest and the plurality of candidate tangible items are consumer products.

11. A system, comprising:
    one or more processors; and
    a memory in communication with the one or more processors, the memory having computer-readable instructions stored thereupon that, when executed by the one or more processors, cause the one or more processors to:
       identify preferred attribute value ranges for a user based on a plurality of first attribute spectrums corresponding to a plurality of tangible items of interest to a user, wherein individual first attribute spectrums define first values for one or more attributes of individual tangible items of interest to the user;
       generate an attribute preference model that corresponds to the user based on the preferred attribute value ranges for the user;
       determine a candidate item category from a plurality of item categories defined with item category data;
       determine a plurality of second attribute spectrums corresponding to a plurality of candidate tangible items of the candidate item category, wherein individual second attribute spectrums define second values for the one or more attributes of individual candidate tangible items that are included within the candidate item category;
       analyze the plurality of second attribute spectrums based on the attribute preference model to designate a selected tangible item of the plurality of candidate tangible items for the user; and
       transmit, to the user, a communication that is associated with the selected tangible item.

12. The system of claim 11, wherein the computer-readable instructions further cause the one or more processors to analyze the item category data with respect to an interest profile that corresponds to the user to select the candidate item category from the plurality of item categories.

13. The system of claim 12, wherein the plurality of item categories includes a first item category and second item category that is disparate from the first item category.

14. The system of claim 11, wherein the computer-readable instructions further cause the one or more processors to:
   determine attribute value distributions of the first values across the plurality of first attribute spectrums based on the preferred attribute value ranges for the user; and
   assign weights to the one or more attributes within the attribute preference model based on the attribute value distributions.

15. The system of claim 14, wherein the weights that are assigned to individual attributes of the one or more attributes are inversely related to the attribute value distributions for the individual attributes.

16. The system of claim 11, wherein the computer-readable instructions further cause the one or more processors to score the individual candidate tangible items based on the attribute preference model.

17. A computer-implemented method, comprising:
   identifying preferred attribute value ranges for a user based on first attribute spectrums that define first values for attributes of tangible items of interest to the user;
   generating, based on the preferred attribute value ranges, an attribute preference model in association with the user;
   determining a candidate item category from a plurality of item categories defined with item category data, wherein the candidate item category includes a plurality of candidate tangible items;
   determining second attribute spectrums that define second values for the attributes of each of a plurality of candidate tangible items in the candidate item category; and
   analyzing the second attribute spectrums based on the attribute preference model to designate a selected item of the plurality of candidate tangible items in association with the user.

18. The computer-implemented method of claim 17, wherein the candidate item category is disparate from the tangible items of interest with respect to the item category data.

19. The computer-implemented method of claim 18, wherein the attribute preference model comprises weights that are inversely related to attribute value distributions associated with individual attributes of the attributes.

20. The computer-implemented method of claim 17, wherein the candidate item category is designated based at least in part on one or more relationship voids between the candidate item category and the tangible items of interest.

* * * * *